(12) United States Patent
Whitney

(10) Patent No.: US 7,975,927 B1
(45) Date of Patent: Jul. 12, 2011

(54) ELECTRONIC TRANSACTION CARD

(76) Inventor: Cecile Whitney, Newport Beach, CA (US)

( * ) Notice: Subject to any disclaimer, the term of this patent is extended or adjusted under 35 U.S.C. 154(b) by 0 days.

(21) Appl. No.: 12/170,511

(22) Filed: Jul. 10, 2008

Related U.S. Application Data

(60) Provisional application No. 60/949,929, filed on Jul. 16, 2007.

(51) Int. Cl.
*G06K 19/06* (2006.01)

(52) U.S. Cl. ....................................................... 235/492

(58) Field of Classification Search .................. 235/487, 235/492, 493, 379, 380; 705/39, 41; 340/572.1
See application file for complete search history.

(56) References Cited

U.S. PATENT DOCUMENTS

| | | | | |
|---|---|---|---|---|
| 4,614,861 A * | 9/1986 | Pavlov et al. | ................... | 235/380 |
| 4,754,418 A * | 6/1988 | Hara | ......................... | 361/679.56 |
| 4,812,634 A * | 3/1989 | Ohta et al. | ..................... | 235/492 |
| 4,868,376 A * | 9/1989 | Lessin et al. | ................... | 235/492 |
| 5,180,902 A * | 1/1993 | Schick et al. | ................... | 235/380 |
| 5,258,935 A * | 11/1993 | Ure | ............................... | 708/106 |
| 5,359,183 A * | 10/1994 | Skodlar | ......................... | 235/493 |
| 5,559,314 A * | 9/1996 | Ohno et al. | ..................... | 235/432 |
| 5,585,787 A * | 12/1996 | Wallerstein | ................... | 340/5.42 |
| 5,634,032 A * | 5/1997 | Haddock | ....................... | 711/112 |
| 5,679,939 A * | 10/1997 | Watanabe | ..................... | 235/379 |
| 5,777,903 A * | 7/1998 | Piosenka et al. | .............. | 708/100 |
| 5,857,079 A * | 1/1999 | Claus et al. | ..................... | 705/33 |
| 6,012,636 A * | 1/2000 | Smith | ............................ | 235/380 |
| 6,019,284 A * | 2/2000 | Freeman et al. | .............. | 235/380 |
| 6,068,183 A * | 5/2000 | Freeman et al. | .............. | 235/375 |
| 6,188,309 B1 * | 2/2001 | Levine | ......................... | 340/5.66 |
| 6,527,192 B1 * | 3/2003 | Altschul et al. | ............... | 235/487 |
| 6,902,115 B2 * | 6/2005 | Graf et al. | ................. | 235/472.01 |
| 7,051,929 B2 * | 5/2006 | Li | ................................. | 235/380 |
| 7,097,108 B2 * | 8/2006 | Zellner et al. | .................. | 235/492 |
| 7,503,504 B2 * | 3/2009 | Mitra | ............................. | 235/492 |
| 2004/0171406 A1 * | 9/2004 | Purk | ............................. | 455/558 |
| 2004/0205023 A1 * | 10/2004 | Hafer et al. | ..................... | 705/43 |
| 2005/0035006 A1 * | 2/2005 | Dohner | ........................... | 206/39 |
| 2007/0073619 A1 * | 3/2007 | Smith | ............................ | 705/41 |
| 2007/0175983 A1 * | 8/2007 | Klug | .............................. | 235/380 |
| 2007/0290049 A1 * | 12/2007 | Ratcliffe | ........................ | 235/492 |
| 2008/0197201 A1 * | 8/2008 | Manessis et al. | .............. | 235/492 |
| 2008/0223938 A1 * | 9/2008 | Faith et al. | ..................... | 235/493 |
| 2009/0078777 A1 * | 3/2009 | Granucci et al. | .............. | 235/492 |
| 2009/0131146 A1 * | 5/2009 | Arezina et al. | .................. | 463/20 |

\* cited by examiner

*Primary Examiner* — Michael G Lee
*Assistant Examiner* — Suezu Ellis
(74) *Attorney, Agent, or Firm* — Kenneth L Tolar

(57) ABSTRACT

An electronic transaction card such as a gift card includes a card member having a front surface and a rear surface. Sandwiched between the front and rear surfaces is a microprocessor that is activated by a solar cell array positioned on the front surface of the card. The microprocessor is in communication with a multi-digit display and a text message display on the front surface of the card member. Whenever the card member is exposed to ambient light, the recipient's name, a prerecorded message and the remaining available balance of the card as previously recorded on the microprocessor automatically appear on the respective displays.

7 Claims, 1 Drawing Sheet

ELECTRONIC TRANSACTION CARD

CROSS REFERENCE TO RELATED APPLICATIONS

This application is entitled to the benefit of provisional application No. 60/949,929 filed on Jul. 16, 2007, the specification of which is incorporated herein by reference.

BACKGROUND OF THE INVENTION

The present invention relates to a uniquely designed electronic transaction card and method that allow a user to readily determine a credit balance remaining thereon.

DESCRIPTION OF THE PRIOR ART

A myriad of gift cards and debit cards exist in the prior art. Typically, the gift card is purchased at a particular retailer where the card is later presented for credit toward purchases. On the rear surface of the card is a magnetic strip on which the value of the purchased credit is recorded. When the recipient later presents the card to the retailer, the value of any purchases is subtracted from the original purchased balance and the remaining balance is rewritten onto the magnetic strip. The process is repeated until the remaining balance of the card is zero.

The conventional gift card described above has numerous disadvantages. The gift card may only be used in the retail facility where the card was purchased. Therefore, if the recipient does not like the retailer, or the goods and services provided therein, the gift card may be wasted. Furthermore, banks and other financial institutions do not benefit because the transaction is consummated exclusively within the retailer's financial structure. Perhaps the biggest disadvantage of conventional gift cards is that the recipient cannot readily determine the available balance without returning to the retailer and requesting that the card be scanned.

A review of the prior art reveals a myriad of financial cards that purportedly overcome some of the disadvantages associated with conventional gift cards. For example, U.S. Pat. Nos. 7,191,952 and 6,631,849 issued to Blossom disclose a multipurpose card including a display for depicting a remaining balance of a particular account.

U.S. Pat. No. 4,754,418 issued to Hara discloses a combined calculator and credit card.

U.S. Pat. No. 5,359,183 issued to Skodlar discloses a payment card with a magnetically controlled display for depicting a current balance or available credit on the payment card.

U.S. Pat. No. 4,068,213 issued to Nakamura et al. discloses a checkout system for merchandising.

Though the patents to Blossom and Skodlar disclose a card having a re-writable display for depicting an available balance, they presumably consume power continuously, which significantly increases the expense associated with the production and operation of the card. Furthermore, none of the prior art devices include a message display panel for selectively displaying a desired, programmable congratulatory message or a means for monitoring past transactions.

The present invention overcomes the deficiencies of the prior art devices by providing an enhanced electronic transaction card that includes a balance display that is active only when the card is exposed to ambient light. Furthermore, the card includes a transaction recording and display means for allowing the card carrier to instantly retrieve past purchase information.

SUMMARY OF THE INVENTION

An electronic transaction card such as a gift card includes a card member having a front surface and a rear surface. Sandwiched between the front and rear surfaces is a microprocessor that is activated by a solar cell array positioned on the front surface of the card. The microprocessor is in communication with a multi-digit display and a text message display on the front surface of the card member. Whenever the card member is exposed to ambient light, the recipient's name, a prerecorded message and the remaining available balance of the card, as previously recorded on the microprocessor, automatically appear on the respective displays.

It is therefore an object of the present invention to provide an electronic transaction card that overcomes the disadvantages and inconveniences associated with conventional gift cards.

It is another object of the present invention to provide a gift card that allows a recipient to readily identify a remaining balance thereon.

Other objects, features, and advantages of the present invention will become readily apparent from the following detailed description of the preferred embodiment when considered with the attached drawings and the appended claims.

DESCRIPTION OF THE PREFERRED EMBODIMENT

Figures 1, 2:
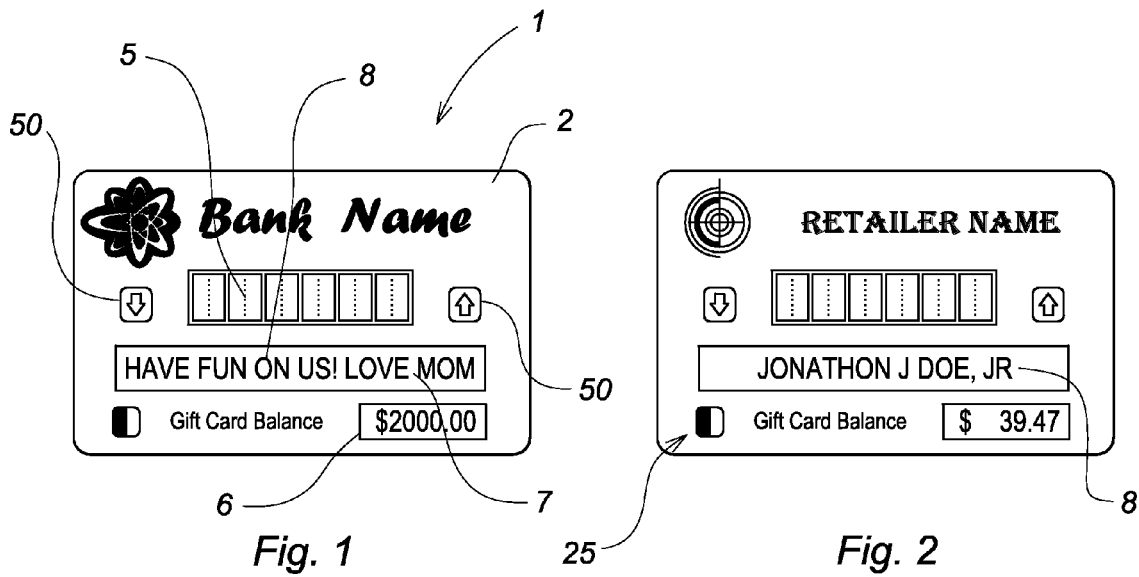
FIG. 1 is a front, plan view of the gift card according to the present invention.
FIG. 2 is a front, plan view of the gift card with a different text message and card balance displayed thereon.
Figures 3, 4:
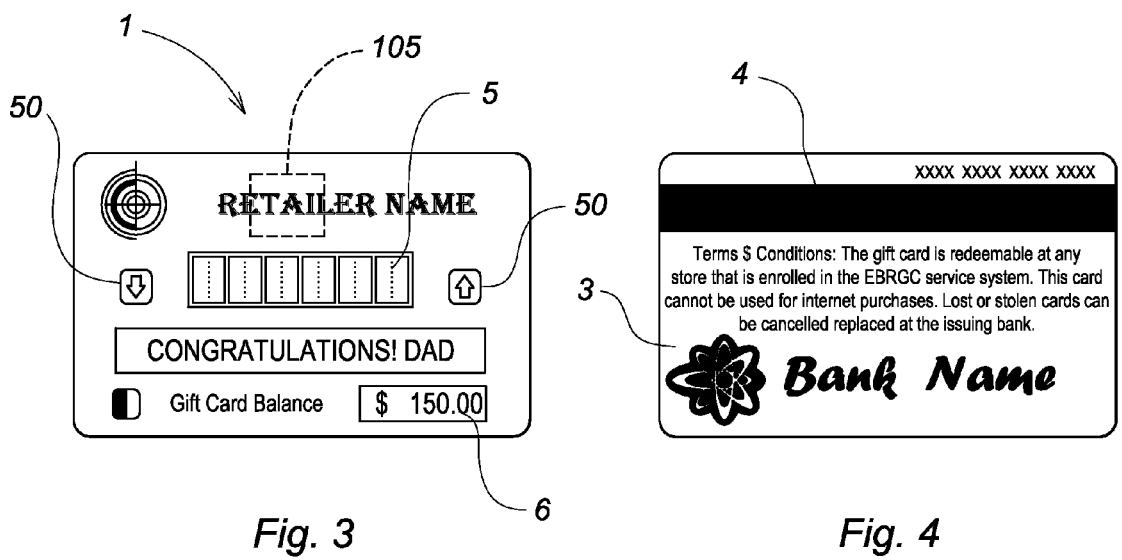
FIG. 3 is a front, plan view of the gift card with the recipient's name displayed thereon.
FIG. 4 is a rear, plan view of the gift card.

The present invention relates to an electronic transaction card such as a gift card. The device comprises a substantially planar card member 1 having a front surface 2 and a rear surface 3. Preferably, the card member is formed of two separate joined layers with associated electronics positioned therebetween. On the rear surface of the card member is a magnetic strip 4 similar to that found on a conventional gift, credit or debit card; the card recipient's name, the initial balance, a personal identification code and a discrete text message are encrypted on the magnetic strip. When requesting an electronic transaction, the card carrier must provide the merchant with the correct personal identification code or the transaction will be disallowed. The gift card is initially linked with a particular bank account so that the funds purchased are automatically deducted therefrom; accordingly, the bank, the retailer and the purchaser all actively participate in the transaction. Furthermore, associating the card with a bank account allows the recipient to use the card at virtually any retailer having a card scanner.

The electronic components include a low-profile, chip-on-board (COB) microprocessor assembly that is in communication with the magnetic strip. The initial balance of the gift card that is recorded onto the magnetic strip is also simultaneously recorded within the microprocessor memory. On the front surface of the card member is a solar cell array 5, a multi-digit, monetary-balance display 6 and a text message display 7, all of which are in communication with the microprocessor. A discrete text message 8 is prerecorded onto the magnetic strip and the microprocessor for later retrieval by the recipient. The message can be any phrase or congratulatory expression associated with various significant events such as birthdays, holidays, weddings, life altering events and graduations.

An organic LED 25 is positioned on the front surface of the card for indicating whether the card value has been completely depleted. As long as the card has any available credit, the LED is illuminated green; when the card's value has been completely exhausted, the LED illumination changes to red thereby conspicuously notifying the user that the card should be replaced or replenished.

Accordingly, when the card is exposed to ambient light, the text message display is activated where the recipient's name appears for a predetermined period; subsequently, the prerecorded message appears on the text message display for a second predetermined period. Simultaneously, the remaining balance is depicted on the multi-digit display allowing the cardholder to readily determine the remaining balance of the card. The multi-digit display remains active as long as the card is exposed to light.

The card further includes a transaction history retrieval system. A scroll switch 50 is positioned adjacent each of two opposing ends of the solar cell. Each time the card is used at a retailer, the magnetic strip is scanned by a card reader and the microprocessor 105 deducts the amount purchased from the remaining recorded balance to calculate a new remaining balance. The new remaining balance is rewritten onto both the magnetic strip and the microprocessor memory. Accordingly, when the card is again exposed to ambient light, the newly recorded remaining balance is displayed on the multi-digit display panel. Furthermore, the amount, location and date of each purchase as well as a description of the goods or services purchased are sequentially recorded onto the microprocessor memory. By depressing either scroll switch, the card carrier can scroll through an itemized list of purchases and the associated date, all of which appear on the text message display. Whenever the card value is replenished, the previously recorded transaction history is deleted; however, a user may retain depleted cards and substitute them with newly programmed cards if a longer, complete transaction history is desired.

The card described above may also be encoded with a budgeting feature that limits the use of the card. The card could only be used for purchases up to a certain threshold during any predetermined time period.

An alternate embodiment of the card according to the above described invention is a prepaid phone card with the purchaser's name and the minutes purchased prerecorded onto the magnetic strip. The card is initially scanned by a reader associated with a public telephone. At the end of the conversation, the card is re-scanned whereby the remaining balance is depicted on the display 6 and the cardholder's name appears in the text message display 7 whenever the card is exposed to ambient light. Accordingly, a user can readily identify the remaining available minutes after each use. Furthermore, the user can depress either of the scroll switches to access a detailed call history including each number dialed and the duration of each call.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. An electronic transaction card comprising:
   a card member having a front surface and a rear surface;
   a magnetic strip on the rear surface of the card member on which recordable electronic data is stored;
   a microprocessor means embedded within said card and in communication with said strip for storing and manipulating text and monetary data recorded onto said strip, and for calculating a remaining balance associated with said card each time an electronic transaction is completed;
   a solar cell on the front surface of said card for generating electrical power whenever said card is exposed to light;
   a multi-digit, monetary-balance display on the front surface of said card member, said monetary-balance display electrically connected to said microprocessor means and said solar cell;
   a text-message display on the front surface of the card member, said text message display in communication with said microprocessor means and said solar cell;
   means for displaying the remaining balance of said card as calculated by said microprocessor means on said multi-digit monetary-balance display whenever said card is exposed to ambient light;
   means for displaying a desired textual message on said text-message display whenever said card is exposed to ambient light, wherein said desired textual message is a cardholder's name that is depicted for a first predetermined duration and wherein said desired textual message is further a prerecorded text message that is displayed on said text-message display for a second predetermined duration after expiration of said first predetermined duration.

2. The electronic transaction card according to claim 1 further comprising an organic LED positioned on the front surface of said card and in communication with said microprocessor means, said LED capable of illuminating in at least two distinguishing visible conditions, said LED illuminating in a first condition whenever the card has available credit, said LED illuminating in a second condition whenever a remaining value as determined by said microprocessor means has been completely exhausted thereby conspicuously notifying a user that the card needs replenishing.

3. The electronic transaction card according to claim 1 further comprising means for retrieving a detailed transaction history of said card.

4. The electronic transaction card according to claim 3 wherein means for retrieving a detailed transaction history of said card comprises a scroll switch positioned adjacent each of two opposing ends of the solar cell, each scroll switch in communication with said microprocessor means whereby depressing either of said scroll switches sequentially depicts details of each electronic transaction on said text message display.

5. The electronic transaction card according to claim 3 further comprising means for deleting said transaction history whenever new monetary data is stored on said strip.

6. The electronic transaction card according to claim 1 further comprising means for limiting purchases to a predetermined dollar amount within any given duration.

7. A method of performing an electronic transaction comprising the steps of:
   providing a card having a magnetic strip thereon;

embedding a microprocessor within said card and electrically connecting said microprocessor to said magnetic strip;

recording a pre-purchased monetary value, a user's name and a predetermined textual message onto said strip;

providing a remaining-balance display on said card;

scanning said magnetic strip upon performing an electronic transaction;

deducting the value of said electronic transaction from the pre-purchased monetary value to calculate a remaining balance;

providing a solar cell on said card for powering said remaining balance display;

depicting the remaining balance on said remaining-balance display only upon said card being exposed to ambient light;

displaying a transaction history on a second display panel positioned on said card;

depicting said predetermined textual message on said second display panel for a limited duration upon said card being exposed to ambient light.

\* \* \* \* \*